(12) United States Patent
Kataoka et al.

(10) Patent No.: US 9,097,606 B2
(45) Date of Patent: Aug. 4, 2015

(54) IMBALANCE CORRECTION METHOD AND IMBALANCE CORRECTION AMOUNT CALCULATION DEVICE FOR ROTOR

(75) Inventors: Nariyuki Kataoka, Kariya (JP); Tetsuya Koyama, Kariya (JP)

(73) Assignee: KABUSHIKI KAISHA TOYOTA JIDOSHOKKI, Aichi-ken (JP)

(*) Notice: Subject to any disclaimer, the term of this patent is extended or adjusted under 35 U.S.C. 154(b) by 272 days.

(21) Appl. No.: 13/824,259

(22) PCT Filed: Aug. 31, 2011

(86) PCT No.: PCT/JP2011/069747
§ 371 (c)(1),
(2), (4) Date: Mar. 15, 2013

(87) PCT Pub. No.: WO2012/043121
PCT Pub. Date: Apr. 5, 2012

(65) Prior Publication Data
US 2013/0174658 A1      Jul. 11, 2013

(30) Foreign Application Priority Data

Sep. 29, 2010 (JP) .................................. 2010-218651

(51) Int. Cl.
G01M 1/22     (2006.01)
G01M 1/16     (2006.01)
G01M 1/30     (2006.01)

(52) U.S. Cl.
CPC . G01M 1/22 (2013.01); G01M 1/16 (2013.01); G01M 1/30 (2013.01)

(58) Field of Classification Search
CPC .......... G01M 1/28; G01M 1/36; G01M 1/16; G01M 1/04; G01M 1/045; G01M 1/225; G01M 1/22; G01M 1/02; G01M 1/24; G01M 1/32; G01M 1/06; G01M 1/08

USPC ............ 73/458, 460, 462, 468, 469, 470, 471
See application file for complete search history.

(56) References Cited

U.S. PATENT DOCUMENTS 4,435,770 A * 3/1984 Shiohata et al. ................. 702/56
4,891,981 A * 1/1990 Schonfeld ....................... 73/460

(Continued)

FOREIGN PATENT DOCUMENTS

CN      101305272 A      11/2008
EP      1 355 139 A1     10/2003

(Continued)

OTHER PUBLICATIONS

Translation of International Preliminary Report on Patentability for corresponding International Patent Application No. PCT/JP2011/069747 issued on Apr. 9, 2013.

*Primary Examiner* — Helen Kwok
(74) *Attorney, Agent, or Firm* — Sughrue Mion, PLLC

(57) ABSTRACT

An imbalance correction method for correcting the imbalance of a rotor measures the vibration state of the rotor before temporary correction and the vibration state of the rotor after the temporary correction in a plurality of rotational speeds in order to make vibration values below the standard. An aggregation range of the tips of correction vectors for obtaining a vibration value which satisfies a vibration standard is calculated from vibration vectors in the rotational speeds. A real correction vector is selected from correction vectors having the tips in a region in which the aggregation ranges calculated for each of the rotational speeds overlap one another among a plurality of the correction vectors. A real correction amount and a real correction phase are set based on the real correction vector. The imbalance of the rotor is corrected based on the real correction amount and the real correction phase.

7 Claims, 8 Drawing Sheets

(56) References Cited

U.S. PATENT DOCUMENTS

| | | | |
|---|---|---|---|
| 5,591,909 A * | 1/1997 | Rothamel et al. | 73/462 |
| 6,789,422 B1 | 9/2004 | Ward, Jr. | |
| 6,829,935 B1 * | 12/2004 | Youells et al. | 73/462 |
| 7,219,036 B2 * | 5/2007 | Abbotoy et al. | 702/183 |
| 7,654,138 B2 * | 2/2010 | Thelen | 73/471 |
| 8,051,710 B2 * | 11/2011 | Van Dam et al. | 73/468 |
| 8,359,921 B2 * | 1/2013 | Oblizajek | 73/460 |

| | | |
|---|---|---|
| 2008/0289416 A1 | 11/2008 | Thelen |

FOREIGN PATENT DOCUMENTS

| | | |
|---|---|---|
| JP | 58-042944 A | 3/1983 |
| JP | 2003-302305 A | 10/2003 |
| JP | 2004-020383 A | 1/2004 |
| JP | 2005-308538 A | 11/2005 |
| JP | 2009-019948 A | 1/2009 |

* cited by examiner

⬤ :PHASE WITH SOLUTION  ⊘ :PHASE WITHOUT SOLUTION

Fig.12(a) Fig.12(b)
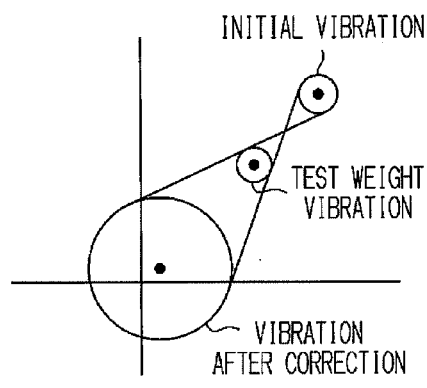 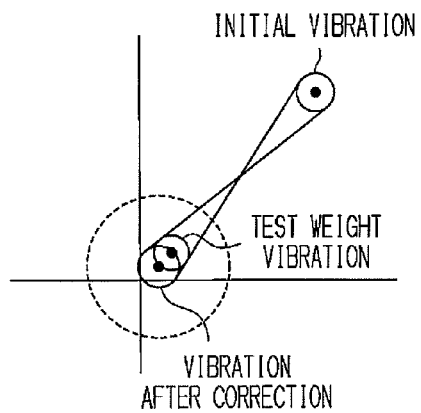
Fig.13
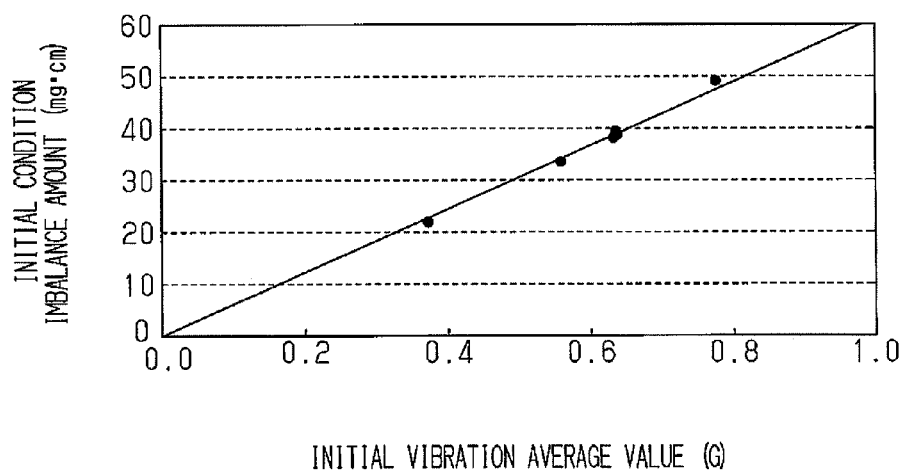

IMBALANCE CORRECTION METHOD AND IMBALANCE CORRECTION AMOUNT CALCULATION DEVICE FOR ROTOR

CROSS REFERENCE TO RELATED APPLICATIONS

This application is a National Stage of International Application No. PCT/JP2011/069747, filed on Aug. 31, 2011, which claims priority from Japanese Patent Application No. 2010-218651, filed Sep. 29, 2010, the contents of all of which are incorporated herein by reference in their entirety.

FIELD OF THE INVENTION

The present invention relates to an imbalance correction method and an imbalance correction amount calculating device for a rotator.

BACKGROUND ART

For rotating devices, such as a turbocharger, a rotating electrical machine, and a power generator turbine, it is necessary to enhance the precisions of respective components of the rotating devices to reduce vibration caused by the rotation of a rotator. In addition to such enhancement, imbalance of the assembled rotating devices is corrected (correction of imbalance). According to the imbalance correction method proposed in Patent Document 1 (Japanese Laid-Open Patent Publication No. 2003-302305) and to a turbocharger assembly, it is attempted to accurately correct the imbalance through two corrections. More specifically, the imbalance correction method disclosed in Patent Document 1 (Japanese Laid-Open Patent Publication No. 2003-302305) performs measurement twice and correction twice on a turbocharger assembly. In the first measurement, an initial imbalance is measured, and in the first correction, such an initial imbalance is eliminated. Next, the second measurement is performed on the turbocharger assembly having undergone the first correction, thereby measuring the remaining imbalance. The measured remaining imbalance is not directly corrected, but is corrected at first based on the ratio of the initial imbalance measured through the first measurement to the corrected level actually performed in the first correction. Next, the second correction is performed so as to correct the remaining imbalance having undergone the correction.

The balance tester proposed in Patent Document 2 (Japanese Laid-Open Patent Publication No. 2005-308538) detects imbalance only at a certain rotation speed (a rotation speed at the time of actual operation in most cases) of a rotator, and the imbalance is corrected based on the detection result or the imbalance is corrected while assuming that the rotator is a rigid body, thereby addressing the technical disadvantage of an imbalance correction method. More specifically, the balance tester of Patent Document 2 (Japanese Laid-Open Patent Publication No. 2005-308538) includes a rotor holding device having a holder member that holds a rotor (rotator) and driven at an arbitrary rotating speed, a rotation speed detector that detects a rotation speed of the rotor, and a vibration detector that detects an imbalance vibration of the rotor at one or multiple locations in the axial direction of the rotor. The rotating speed detector and the vibration detector measure the imbalance vibration of the rotor for each arbitrary rotation speed set in advance from the slowest rotation speed to the fastest rotation speed. The balance tester calculates a correction weight to be added or subtracted at certain location (corrected face) of the rotor in the axial direction set in advance based on the measured result. The imbalance tester of Patent Document 2 (Japanese Laid-Open Patent Publication No. 2005-308538) includes a control device, which predicts a remaining vibration at each rotation speed when it is presumed that the correction weight is added to or subtracted from the corrected face, and displays the weight level of the correction weight to be attached to the corrected face and the phase angle. The tester measures the remaining vibration with the correction weight corresponding to the weight level displayed by the control device being actually attached to the corrected face, and repeats those successive processes until the remaining vibration becomes smaller than a managing value. The correction weight is calculated through the lowest square technique.

SUMMARY OF THE INVENTION

Problems that the Invention is to Solve

The imbalance correction method disclosed in Patent Document 1 is a correction for making the vibration value at a certain rotation speed (a rotation speed with a maximum vibration value) to be zero. FIG. 17 of the present application illustrates how a vibration value indicated by a dashed line is made to be zero at a certain rotation speed (correction rotation speed in FIG. 17). In this case, however, the vibration cannot be suppressed in some cases as small as possible at any rotation speeds other than the certain rotation speed. In the case of FIG. 17, the vibration value indicated by a continuous line exceeds the vibration standards at both sides of the certain rotation speed. The practical rotation speed of the rotator in a rotating device like a turbocharger spreads, however, across the wide range, and it is necessary that the standards for an axial vibration of the rotator have a vibration value set to be less than or equal to a certain value within the range of the rotation speed widespread to some level; That is, the imbalance correction method disclosed in Patent Document 1 does not satisfy the axial vibration standards of the rotating device like a turbocharger in some cases.

In contrast, the balance tester disclosed in Patent Document 2 measures imbalance vibration of the rotor for each arbitrary rotation speed set in advance between the slowest rotation speed and the fastest rotation speed, and calculates the correction weight based on the measured result. Next, the balance tester predicts the remaining vibration at each rotation speed when it is presumed that the correction weight is added to or subtracted from the corrected face. Hence, unlike Patent Document 1, the balance tester of Patent Document 2 can cope with the axial vibration standards having, at a rotation speed within the range of the rotation speed widespread to some level, a vibration value of a rotator set to be less than or equal to a certain value. According to the balance tester of Patent Document 2, however, the correction weight is calculated through the lowest square technique, and thus the remaining vibration may become out of the standards within the range of the determination rotation speeds. When, for example, the remaining vibration value is extremely small at a rotation speed other than the certain rotation speed but when the remaining vibration value exceeds the standards only at the certain rotation speed, the remaining vibration value often exceeds the standards at the certain rotation speed even if the correction weight calculated and optimized through the lowest square technique is applied.

It is an objective of the present invention to provide an imbalance correction method and an imbalance correction amount calculating device for a rotator that can cause a vibration value within a range of determination rotation speeds to be less than or equal to standards.

Means for Solving the Problems

To achieve the foregoing objective and in accordance with one aspect of the present invention, an imbalance correction method for correcting imbalance of a rotator is provided. The method includes measuring a vibration state of the rotator before a provisional correction and a vibration state of the rotator after the provisional correction at multiple rotation speeds within a range of determination rotation speeds. The method also includes calculating, from vibration vectors at the respective rotation speeds, a range of set of terminal points of correction vectors for obtaining a vibration value satisfying a vibration standards for each rotation speed. The method further includes: selecting a definite correction vector from the correction vectors having terminal points in an area where the respective ranges of the sets calculated for the respective rotation speeds overlap with each other among the plurality of correction vectors; setting a definite correction amount and a definite correction phase based on the definite correction vector; and correcting the imbalance of the rotator based on the definite correction amount and the definite correction phase.

The term "range of determination rotation speeds" means a range of rotation speeds at which a determination on whether or not a vibration value of the rotator is within a vibration standards when the rotator rotates at that rotation speed. That is, the "range of determination rotation speeds" is selected within the range of rotation speeds of the rotator when the rotator rotates, i.e., the range of actual rotation speeds, and is not always consistent with the range of actual rotation speeds. The term "definite correction vector" is a correction vector including a correction amount (definite correction amount) and a correction phase (definite correction phase) for correcting the imbalance of the rotator finally after a provisional correction. The term "vibration state of rotator" can be expressed by, for example, a vibration value of the rotator and a phase thereof.

According to this imbalance correction method, with respect to the rotator subjected to a provisional imbalance correction, a vibration state of the rotator before the provisional correction and a vibration state of the rotator after the provisional correction are measured at multiple rotation speeds within the range of the determination rotation speeds. Next, a range of a set of terminal points of correction vectors for obtaining a vibration value satisfying the vibration standards is calculated for each rotation speed from the vibration vector at each rotation speed in both vibration states. Subsequently, the definite correction vector is selected from the correction vectors having terminal points in an area where respective ranges of the sets overlap with each other among the plurality of correction vectors. The correction amount (definite correction amount) and the correction phase (definite correction phase) for performing final imbalance correction are set based on that definite correction vector. Moreover, the imbalance correction is performed based on the definite correction amount and the definite correction phase. Hence, the imbalance correction method can set the vibration value of the rotator within the range of the determination rotation speeds to be less than or equal to the standards.

In the imbalance correction method, a correction phase when the provisional correction is performed is preferably set based on an initial vibration phase of the rotator at a rotation speed corresponding to a natural frequency of a jig. The term "natural frequency of jig" means a natural frequency of a unit that entirely includes a jig and the rotator in a non-rotated condition with the rotator being supported by the jig that is used when the vibration state of the rotator is measured.

When the imbalance correction method is performed, depending on the imbalance state of the rotator before the provisional correction, there is a tendency that an adequate definite correction vector cannot be set if the correction phase is set to be within a predetermined range when the provisional correction is performed. However, when the provisional correction phase that is a phase when the provisional correction is performed is set as described above in association with the jig natural frequency, the provisional correction phase becomes a further adequate value. Hence, the imbalance correction method can set a further adequate definite correction vector regardless of the imbalance state of the rotator before the provisional correction.

In the imbalance correction method, a correction amount when the provisional correction is performed is preferably calculated based on a relationship between an average value of initial vibration values of the rotator and an initial condition imbalance amount. When the imbalance correction method is applied, depending on the imbalance state of the rotator before the provisional correction and the provisional correction amount that is a correction amount when the provisional correction is applied; there is a tendency that the vibration value of the rotator does not satisfy the vibration standards. That is, when the imbalance correction is performed based on the definite correction amount and the definite correction phase both set based on the definite correction vector, the vibration value after the definite correction is likely to become inconsistent with the predicted vibration value. When, however, the provisional correction amount that is a correction amount when the provisional correction is applied is calculated as described above in association with the average value of the initial vibration values, the provisional correction amount becomes further an adequate correction amount. Hence, the vibration value of the rotator after the imbalance correction is performed based on the definite correction amount and the definite correction phase both set based on the definite correction vector further surely satisfies the vibration standards.

In the imbalance correction method, as the definite correction vector, a correction vector having a highest correction effect is preferably selected among the correction vectors having terminal points in the area where the respective ranges of the sets overlap with each other. In this case, the optimized correction vector is selected as the definite correction vector.

In accordance with another aspect of the present invention, an imbalance correction amount calculating device is provided that calculates a correction amount for correcting imbalance of a rotator. The device includes a rotation speed measuring unit that detects a rotation speed of the rotator, a vibration value measuring unit, a vibration phase measuring unit, and a calculating unit that calculates an adequate correction amount for correcting the imbalance of the rotator. The calculating unit calculates, for each rotation speed, a range of set of terminal points of correction vectors for obtaining a vibration value satisfying a vibration standards from a vibration vector at each rotation speed based on a vibration state of the rotator before a provisional correction and a vibration state of the rotator after the provisional correction both measured at multiple rotation speeds within a range of determination rotation speeds. The calculating unit also selects a definite correction vector from the correction vectors having terminal points in an area where the respective ranges of the sets at the respective rotation speeds overlap with each other among the plurality of correction vectors.

Further, the calculating unit calculates the adequate correction amount based on the definite correction vector. The term "adequate correction amount" means a correction amount (definite correction amount) and a correction phase (definite correction phase) both necessary for correcting the imbalance of the rotator.

Such an imbalance correction amount calculating device can perform, among the processes when the above-described imbalance correction method is carried out, processes up to the decision of a correction amount (definite correction amount) and a correction phase (definite correction phase) for eventually correcting the imbalance based on the definite correction vector. When the imbalance of the rotator is eventually corrected by the definite correction amount and the definite correction phase both calculated in this manner, the vibration value of the rotator within the range of the determination rotation speeds can be less than or equal to the standards.

The calculating unit preferably calculates a correction phase when the provisional correction is performed based on an initial vibration phase of the rotator at a rotation speed corresponding to a natural frequency of a jig. Hence, the imbalance correction amount calculating device can calculate an adequate definite correction vector regardless of the imbalance state of the rotator before the provisional correction.

The calculating unit preferably calculates a correction amount when the provisional correction is performed based on a relationship between an average value of initial vibration values of the rotator and an initial condition imbalance amount. Hence, the provisional correction amount becomes an adequate correction amount. The vibration value of the rotator after the imbalance correction is performed by the definite correction amount and the definite correction phase both set based on the definite correction vector always satisfies the vibration standards.

BRIEF DESCRIPTION OF THE DRAWINGS

FIGS. 12(a) and 12(b) are diagrams each illustrating a relationship among an initial vibration, a trial corrected vibration and an actually corrected vibration;

FIG. 13 is a graph illustrating a relationship between initial-condition imbalance amount and an initial vibration average value;

DETAILED DESCRIPTION OF THE PREFERRED EMBODIMENTS

FIGS. 1 to 7 illustrate an imbalance correction method for an automobile turbocharger according to a first embodiment of the present invention.

Figure 1:
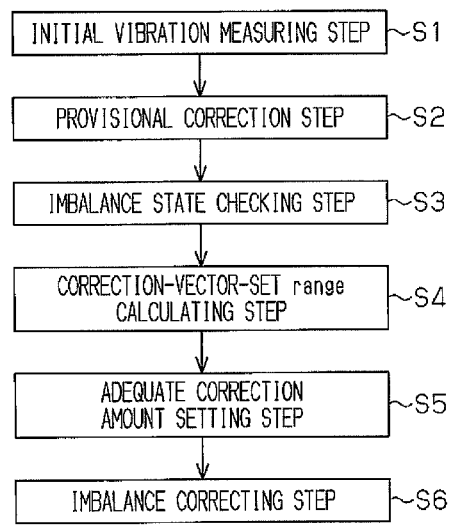
FIG. 1 is a flowchart illustrating a procedure of an imbalance correction method according to a first embodiment.

As illustrated in FIG. 1, the imbalance correction method includes an initial vibration measuring step S1, a provisional correction step S2, an imbalance state checking step S3, a correction-vector-set range calculating step S4, an adequate correction amount calculating step S5, and an imbalance correcting step S6.

In the initial vibration measuring step S1, an initial vibration state of the turbocharger that is a rotating device, i.e., a vibration state before a provisional correction, more specifically, a vibration value of the turbocharger before the provisional correction and a phase thereof are measured at multiple rotation speeds within a range of determination rotation speeds. Next, a relationship between the rotation speed and the vibration value and the relationship between the rotation speed and the phase are obtained for each rotation speed.

In the provisional correction step S2, a provisional correction is performed based on an arbitrary correction vector. In order to correct the imbalance of the turbocharger, there are a technique of adding a weight to the turbocharger and a technique of removing a correction part, which is a part of the turbocharger. In the present embodiment, a technique for removing a correction part is carried out.

In the imbalance state checking step S3, the vibration states of the turbocharger having undergone a provisional correction are measured at multiple rotation speeds within the range of the determination rotation speeds. A relationship between a circle indicating a vibration standards and a vibration vector is obtained from the measurement result for each rotation speed.

In the correction-vector-set range calculating step S4, respective ranges of the set of terminal points of the correction vectors at respective rotation speeds within the range of the determination rotation speeds are calculated based on the relationship between the vibration vectors at multiple rotation speeds within the range of the determination rotation speeds obtained in the imbalance state checking step S3 and the circle indicating the vibration standards, and a correction vector for correcting the imbalance of the vibration measured in the initial vibration measuring step S1.

In the adequate correction amount calculating step S5, a definite correction vector is selected based on an area where respective ranges of set of the terminal points of the correction vectors at respective rotation speeds calculated in the correction-vector-set range calculating step S4 overlap with each other. A definite correction amount is calculated from the vibration value of the definite correction vector. Moreover, a definite correction phase is calculated and set from the phase of the definite correction vector.

In the imbalance correcting step S6, a correction processing is performed based on the definite correction amount and the definite correction phase calculated in the adequate correction amount calculating step S5.

Figure 2:
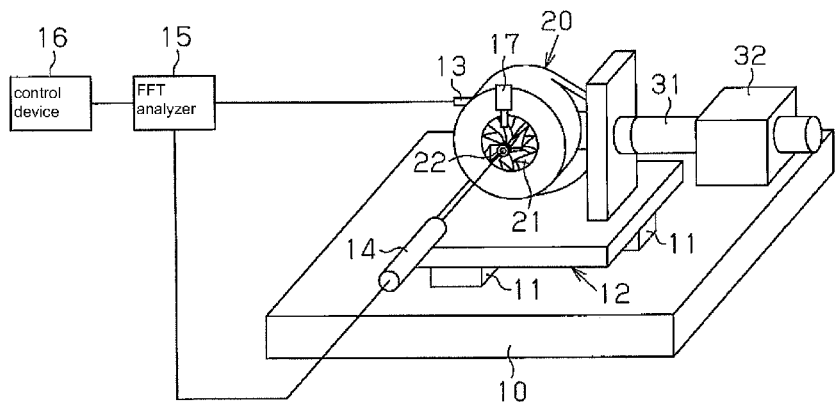
FIG. 2 is a schematic view illustrating a correction device that performs the imbalance correction method of FIG. 1 and a rotating device subjected to the correction.

FIG. 2 illustrates a correction device that carries out the imbalance correction method. The correction device includes an mounting jig 12 fastened on a base plate 10 via a vibration absorbing rubber members 11, a vibration pickup unit 13, a laser rotation indicator 14, which is a rotation speed measuring unit, an FFT analyzer 15, a control device 16, which is a calculating unit, and a correction machining device 17. An imbalance correction amount calculating device that calculates an adequate correction amount for correcting the imbalance of a turbocharger 20 includes the base plate 10, the vibration absorbing rubber members 11, the mounting jig 12, the vibration pickup unit 13, the laser rotation indicator 14, the FFT analyzer 15, and the control device 16. A vibration value measuring unit that measures the vibration value of the turbocharger 20 and a vibration phase measuring unit that measures the vibration phase of the turbocharger 20 are configured by the vibration pickup unit 13 and the FFT analyzer 15, respectively.

The turbocharger 20 is mounted on the mounting jig 12. The mounting jig 12 is in communication with a supply piping 31 that supplies factory air as compressed air to the intake port (not shown) of the turbocharger 20. The supply piping 31 is provided with a flow rate regulating valve 32 that adjusts the flow volume of the compressed air supplied to the turbocharger 20. Adjustment of the flow rate regulating valve 32 makes the rotation speed of the turbine wheel of the turbocharger 20 adjustable.

The vibration pickup unit 13 measures the vibration of the turbocharger 20, and outputs a measurement signal obtained as a measurement result to the FFT analyzer 15. The laser rotation indicator 14 measures the rotation speed of an impeller 21 that is a rotator of the turbocharger 20, and outputs a measurement signal obtained as a measurement result of the rotation speed to the FFT analyzer 15.

The FFT analyzer 15 performs frequency analysis based on measurement signals received from the vibration pickup unit 13 and the laser rotation indicator 14, respectively, and outputs a signal that is an analysis result to the control device 16.

The control device 16 calculates, for each rotation speed based on a vibration state of the rotator before a provisional correction (i.e., the vibration value of the turbocharger 20 and the phase thereof) measured at the multiple rotation speeds within the range of the determination rotation speeds based on the output signal received from the FFT analyzer 15, and the vibration state after the provisional correction, the range of the set of terminal points of correction vectors for obtaining a vibration value satisfying the vibration standards from the vibration vectors at respective rotation speeds. The control device 16 selects the definite correction vector from the correction vectors having respective terminal points located in an area where the ranges of the sets at respective rotation speeds overlap with each other among the plurality of correction vectors. The control device 16 calculates an adequate correction amount for correcting the imbalance of the rotator, i.e., the definite correction amount and the definite correction phase (correction direction) based on the selected definite correction vector. In the present embodiment, acceleration is utilized as the vibration value. The control device 16 outputs signals including the definite correction amount and the definite correction phase to the correction machining device 17 based on the adequate correction amount.

The correction machining device 17 corrects the imbalance based on the signals output by the control device 16. The correction machining device 17 corrects the imbalance by cutting an impeller nut 22 for fastening the impeller 21 to the shaft.

(Operation)

Next, an explanation will be given of an action of the correction device employing the above-described structure.

As illustrated in FIG. 2, with the turbocharger 20 being mounted at a predetermined portion of the correction device through the mounting jig 12, the imbalance correction method is carried out in accordance with the flowchart of FIG. 1.

First, in the initial vibration measuring step S1, the control device 16 receives measurement signals from the vibration pickup unit 13 and the laser rotation indicator 14 through the FFT analyzer 15 within the range of the determination rotation speeds, thereby checking (grasping) the initial vibration state of the turbocharger 20, i.e., the initial vibration value of the turbocharger 20 and the initial phase thereof. More specifically, the control device 16 adjusts the flow rate regulating valve 32, thereby changing the rotation speed of the impeller 21 at the interval of 200 rpm within the range of determination rotation speeds, which are, for example, from 60000 rpm to 85000 rpm. The control device 16 receives the measurement signals from the vibration pickup unit 13 and the laser rotation indicator 14 at each rotation speed through the FFT analyzer 15. As a result, the control device 16 obtains the relationship between the rotation speed of the turbocharger 20 and the vibration value thereof as illustrated in FIG. 3(a), and obtains the relationship between the rotation speed and the phase as illustrated in FIG. 3(b).

Figure 3A:
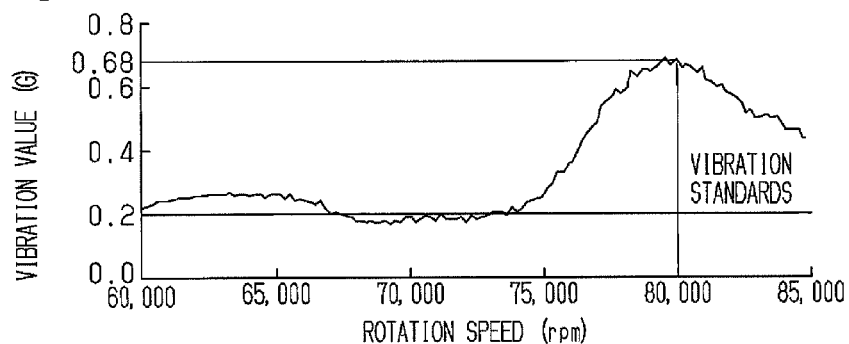
FIG. 3(a) is a graph illustrating a relationship between a rotation speed and a vibration value of a rotator illustrated in FIG. 2 in an initial vibration state.
Figure 3B:
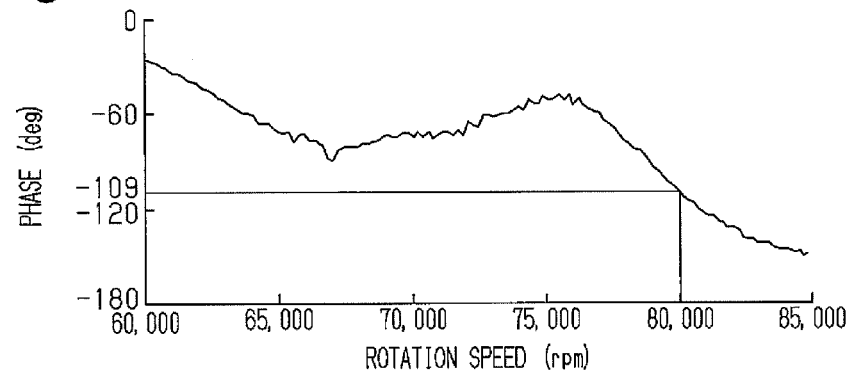
FIG. 3(b) is a graph illustrating a relationship between a rotation speed and a phase in the initial vibration state.
Figure 4:
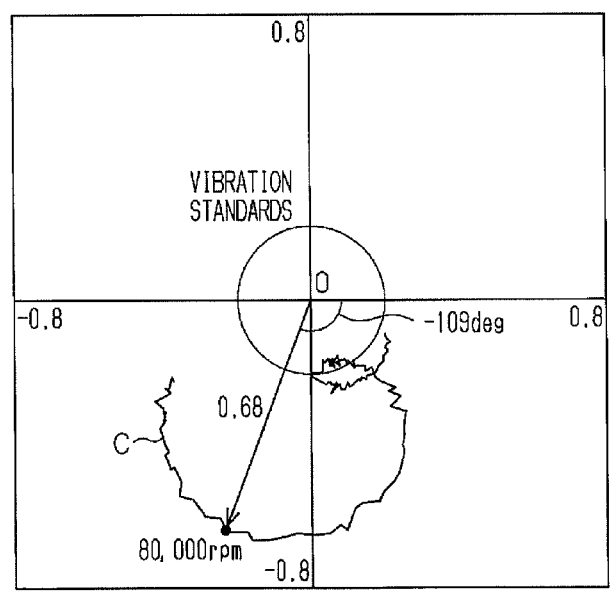
FIG. 4 is a diagram illustrating, with a mode circle, a relationship between a vibration vector and a vibration standards of the rotator illustrated in FIG. 2.

As illustrated in FIG. 3(a), the vibration value of the turbocharger 20 becomes the maximum at the rotation speed of, for example, 80000 rpm, and as illustrated in FIG. 3(b), the phase at this time is −109 degrees. When this relationship is drawn with a mode circle technique such that, in a coordinate system having an origin and a reference axis, the vibration value is expressed by a distance from the origin of the coordinate and the phase is expressed by an angle from the reference axis of the coordinate, a curve C illustrated in FIG. 4 is obtained. The curve C is a trace of the terminal point of the vibration vector. The reference axis is an axis running to the right from the origin in FIG. 4. The phase is indicated by a positive value when measured in the counterclockwise direction from the reference axis, and is indicated by a negative value when measured in the clockwise direction. In FIG. 4, a straight line having an initial point that is the origin and a terminal point that is a dot over the curve C is a vibration vector at the rotation speed corresponding to that point. FIG. 4 illustrates the vibration vector at the rotation speed of 80000 rpm. FIG. 4 draws the vibration standards by a circle around the origin. That is, in FIG. 4, a portion of the curve C indicating the rotation speed of the turbocharger 20 other than portions located within the circle of the vibration standards (i.e., portion outwardly of circle) does not satisfy the vibration standards.

Next, in the provisional correction step S2, the control device 16 performs provisional correction on the imbalance of the turbocharger 20 based on an arbitrary correction vector. More specifically, the control device 16 calculates, for example, a correction vector corresponding to the vibration vector at the rotation speed of the maximum vibration value. Moreover, the control device 16 outputs signals including the correction amount and the correction direction calculated based on the vibration value of the correction vector and the phase thereof to the correction machining device 17. The correction machining device 17 cuts the impeller nut 22 based on the signals output by the control device 16 (see, for example, the impeller nut 22 and a grinding tool 26 illustrated in FIG. 15).

Figure 5A:
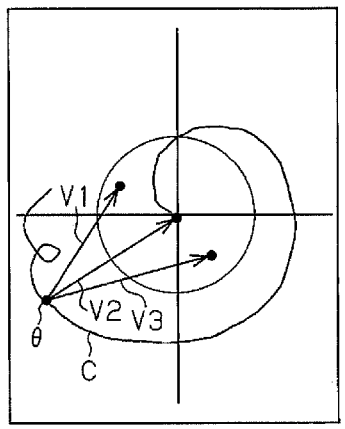
FIGS. 5(a) and 5(b) are diagrams each illustrating an operation of obtaining a correction vector that causes a vibration value at a certain rotation speed to be within standards.

Subsequently, in the imbalance state checking step S3, the control device 16 receives respective measurement signals from the vibration pickup unit 13 and the laser rotation indicator 14 through the FFT analyzer 15 at multiple rotation speeds within the range of the determination rotation speeds, thereby checking and grasping the vibration state (vibration value and phase) of the turbocharger 20. Hence, like the initial vibration measuring step S1, the relationship between the rotation speed of the turbocharger 20 and the vibration value thereof and the relationship between the rotation speed of the turbocharger 20 and the phase thereof are obtained at multiple rotation speeds within the range of the determination rotation speeds. Next, the control device 16 obtains a relationship between a circle indicating the vibration standards of the turbocharger 20 and the vibration vector at each rotation speed at the interval of 200 rpm within the range of the determination rotation speeds. More specifically, based on a relationship among each rotation speed, vibration value, and phase, as illustrated in FIG. 5(a), in the coordinate system having the vibration value expressed by a distance from the origin and the phase expressed by an angle from the reference axis, the curve C indicating the position of the terminal point of the vibration vector at each rotation speed is drawn. The terminal point of the vibration vector at each rotation speed is expressed as a dot over the curve illustrated in FIG. 5(a). Respective straight lines having the initial point that is the origin in the coordinate of FIG. 5(a) and a terminal point that is a dot over the curve C are vibration vectors at respective rotation speeds.

Figure 5B:
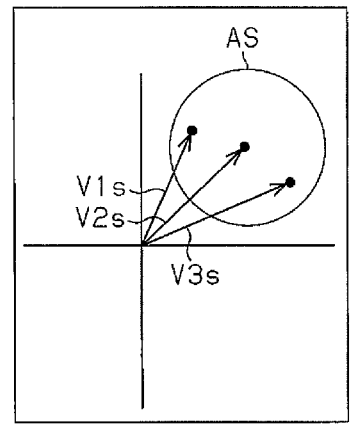

Next, in the correction-vector-set range calculating step S4, the control device 16 calculates the range of the set of the terminal points of the correction vectors at respective rotation speeds based on the relationship between the vibration vector at each rotation speed within the range of the determination rotation speeds obtained in the imbalance state checking step S3 and the circle indicating the vibration standards. The number of the correction vectors that causes the vibration value at a certain rotation speed θ rpm to be within the vibration standards is not limited to one. For example, as illustrated in FIG. 5(a), corresponding to respective vectors V1, V2, and V3 that interconnect dots θ corresponding to the certain rotation speed and over the curve C with dots (only three dots are illustrated in the figure as representative examples) within the circle of the vibration standards, correction vectors V1s, V2s and V3s are present as illustrated in FIG. 5(b). As illustrated in FIG. 5(b), the range within a circle AS where the terminal points of all correction vectors V1s, V2s, and V3s calculated correspondingly to the respective vectors V1, V2, and V3 in FIG. 5(a) is the range of the set of the terminal points of the correction vectors.

Figure 6A:
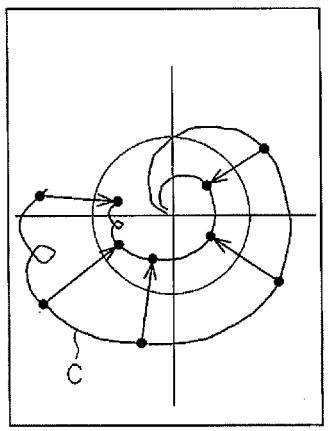
FIGS. 6(a) and 6(b) are diagrams each illustrating an operation of obtaining a correction vector that causes a vibration value at each rotation speed to be within the standards.
Figure 6B:
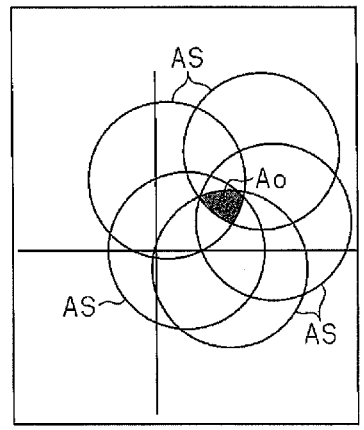

Next, in the adequate correction amount calculating step S5, the control device 16 calculates the range of the set of the terminal points of the correction vectors at respective rotation speeds over the curve C before standardization illustrated in FIG. 6(a). As illustrated in FIG. 6(b), the range of the set of the terminal points of the correction vectors corresponding to the respective rotation speeds can be represented as the circle AS having a part of the range of the set overlapping the circle AS of the range of another set. In FIG. 6(b), a straight line having a terminal point that is a dot within an overlap area Ao of each circle As and an initial point that is the origin of the coordinate is a correction vector indicating an adequate correction amount. More specifically, the correction vector causes the vibration value at each rotation speed within the range of the determination rotation speeds of the turbocharger 20 having undergone imbalance correction to be within the vibration standards. The control device 16 simulates an imbalance correction effect to all correction vectors indicating the adequate correction amount when a correction is performed based on the correction amount and the correction phase calculated on the basis of those correction vectors. Next, the control device 16 selects the definite correction vector that is the correction vector having the highest correction effect, thereby calculating the adequate correction amount (definite correction amount and definite correction phase) from the vibration value of the definite correction vector and the phase thereof.

Figure 7:
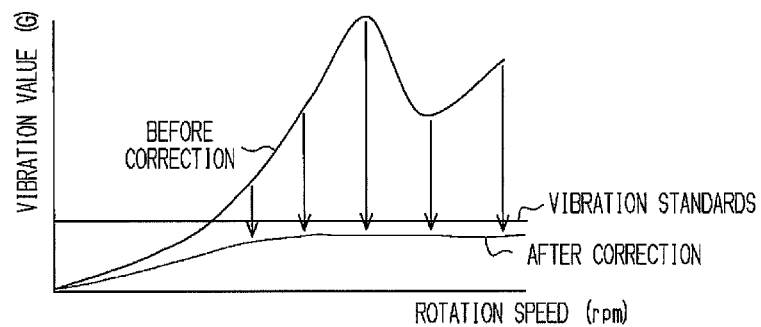
FIG. 7 is a graph illustrating a relationship between a rotation speed and a vibration value of the rotator before and after the imbalance correction.

Thereafter, in the imbalance correcting step S6, the control device 16 outputs, to the correction machining device 17, instruction signals indicating the definite correction amount (cutting level) and the definite correction phase (cutting position) of the impeller nut 22 corresponding to the adequate correction amount calculated in the adequate correction amount calculating step S5. The correction machining device 17 cuts the impeller nut 22 based on the instruction signals. After the imbalance correcting step S6, the relationship between the vibration value of the turbocharger 20 and the rotation speed thereof becomes to have the vibration values satisfying the vibration standards at all rotation speeds within the range of the determination rotation speeds as illustrated in FIG. 7.

According to such an embodiment, the following advantages are achieved.

(1) The imbalance correction method measures the vibration state (vibration value of a rotator and phase thereof) of the rotator before a provisional correction and the vibration state of the rotator after the provisional correction at multiple rotation speeds within the range of determination rotation speeds. Moreover, the imbalance correction method calculates, for each rotation speed, the range of the set of terminal points of correction vectors for obtaining the vibration value that satisfy the vibration standards from the vibration vector at each rotation speed. Furthermore, the imbalance correction method selects the definite correction vector from the correction vectors having terminal points in an area where the respective ranges of the sets at the respective rotation speeds overlap with each other among the plurality of correction vectors. Next, the imbalance correction method calculates the definite correction amount and the definite correction phase based on the definite correction vector, and corrects the imbalance of the rotator based on those definite correction amount and definite correction phase. Hence, the imbalance correction method can cause the vibration value of the turbocharger 20 within the range of the determination rotation speeds to be less than or equal to the standards.

(2) The imbalance correction method selects, as the definite correction vector, the correction vector having the highest correction effect among the correction vectors having the terminal points in an area where the respective ranges of the sets overlap with each other. Hence, the optimized correction vector can be selected as the definite correction vector.

(3) The correction device includes the imbalance correction amount calculating device (10 to 16) and the correction machining device 17. The imbalance correction amount calculating device (10 to 16) includes the rotation speed measuring unit that detects the rotation speed of the rotator, the vibration value measuring unit, the vibration phase measuring unit, and the calculating unit that calculates the adequate correction amount for correcting the imbalance. The calculating unit calculates, for each rotation speed, the range of the set of terminal points of correction vectors for obtaining the vibration value satisfying the vibration standards from the vibration vector at each rotation speed based on the vibration state (vibration value of rotator and phase thereof) of the rotator before the provisional correction and measured at multiple rotation speeds within the range of the determination rotation speeds and the vibration state of the rotator after the provisional correction. Moreover, the calculating unit selects the definite correction vector from the correction vectors having the terminal points in an area where the respective ranges of the sets at the respective rotation speeds overlap with each other among the plurality of correction vectors. Next, the calculating unit calculates the adequate correction amount for correcting the imbalance of the rotator based on the definite correction vector. Hence, the imbalance correction amount calculating device can perform the procedures of performing the imbalance correction method up to the decision of the definite correction amount and the definite correction phase for the final imbalance correction of the rotator based on the definite correction vector. Subsequently, the correction machining device 17 performs final imbalance correction on the rotator based on the decided definite correction amount and definite correction phase, and thus the correction device can cause the vibration value within the range of the determination rotation speed of the rotator to be less than or equal to the standards.

FIGS. 8 to 11 illustrate a second embodiment of the present invention. In this embodiment, when a provisional correction (trial cutting) is performed in the provisional correction step S2, a provisional correction phase that is a correction phase when a trial cutting is performed on the impeller nut 22 is calculated based on the initial vibration phase at the rotation speed of the rotator corresponding to the natural frequency of the jig. The second embodiment differs from the first embodiment in this point. The same elements as those of the first embodiment will be denoted by the same reference numerals and the detailed explanation thereof will be omitted.

Figure 8:
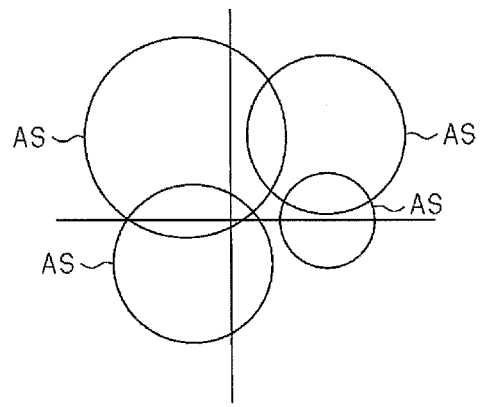
FIG. 8 is a schematic diagram illustrating a case in which some of circles representing the range of a set of terminal points of correction vectors at respective rotation speeds do not overlap.

When the imbalance correction method of the first embodiment was applied to various workpieces (turbochargers), as illustrated in FIG. 8, in the adequate correction amount calculating step S5, some circles among the circles AS had no overlap area with other some circles depending on the workpiece. In FIG. 8, for example, the lower left circle As does not overlap the upper right circle AS and the lower right circle AS. Those circles AS indicate the range of the set of terminal points of correction vectors for obtaining the vibration value satisfying the vibration standards among the correction vectors calculated from the vibration vectors at respective rotation speeds. A cause of such circles AS, which did not overlap with each other, was studied and it was found that when a correction was performed in a bend increasing direction in which bending of the rotator was increased, the apparent imbalance amount of the rotator was increased, and the linear relationship between the imbalance and the vibration was not satisfied. It was concluded that, in this case, the calculation result of the correction vector may contain errors, and thus some circles AS may have no overlap area with other some circles AS.

Figure 9:
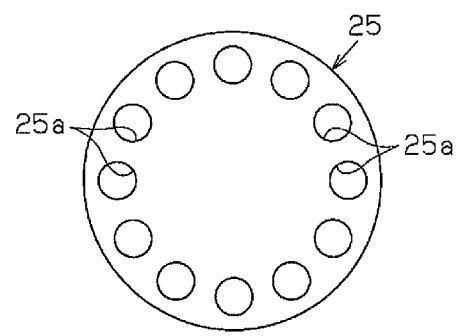
FIG. 9 is a front view illustrating a test weight installer.
Figure 10A:
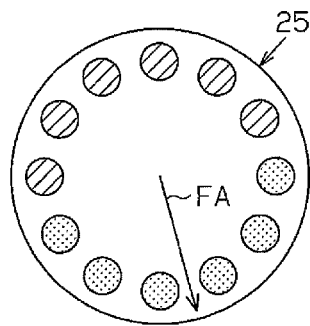
FIGS. 10(a) to 10(d) are diagrams each illustrating a relationship between an installed position of a test weight in a different workpiece with a no-solution position and presence/absence of a solution.
Figure 10B:
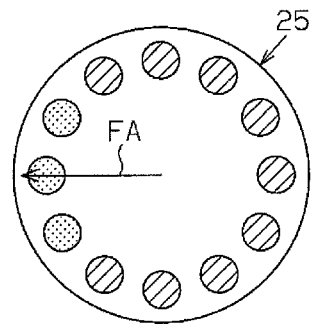
Figure 10C:
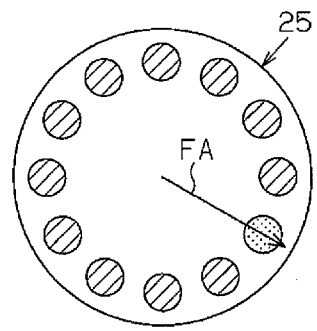
Figure 10D:
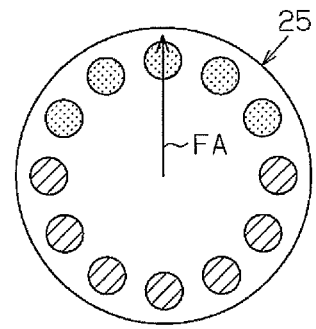

In order to confirm this idea, as illustrated in FIG. 9, a test weight installer 25 having a plurality of installation holes 25a for test weights formed in the circumferential direction at a predetermined pitch was attached to a workpiece that had caused a technical problem in the adequate correction amount calculating step S5. In FIG. 9, 12 installation holes 25a were formed at an equal pitch. Next, with test weights being installed successively in the respective installation holes 25a, a phase with a solution and a phase without a solution were examined. The term "a phase with a solution" means a phase when all circles AS among the plurality of circles AS have a partial overlap area in the adequate correction amount calculating step S5 with the test weight being installed in the installation hole 25a at that phase. The respective circles AS indicate the range of the set of terminal points of correction vectors calculated to obtain the vibration value satisfying the vibration standards based on the vibration vector at each rotation speed. Moreover, the term "a phase without a solution" means a phase when there is a circle AS that does not overlap the other circles AS among the plurality of circles AS in the adequate correction amount calculating step S5 with the test weight being installed in the installation hole 25a at that phase. In this case, also, the circle AS indicates the range of the set of terminal points of correction vectors calculated to obtain the vibration value satisfying the vibration standards based on the vibration vector at each rotation speed.

As a result, it was confirmed that there is no "without a solution" condition in all phases even in the case of the workpiece having a technical problem in the adequate correction amount calculation step S5, i.e., the workpiece without a solution. FIGS. 10(*a*) to 10(*d*) exemplify some examined results. In FIG. 10(*a*), the lower half of the test weight installer 25 is the phase with a solution, while the upper half thereof is the phase without a solution. In FIG. 10(*b*), the left part is the phase with a solution, while the remaining portions are the phase without a solution. In FIG. 10(*c*), only one part at the diagonal lower right is the phase with a solution, while the remaining portions are the phase without a solution. In FIG. 10(*d*), the upper half is the phase with a solution, while the lower half is the phase without a solution. It became clear that there were phases with solutions and phase without solution for each workpiece. Moreover, it was confirmed that the phases with solutions were continuously present in the circumferential direction of the workpiece, and the phases without solution were also continuously present in the circumferential direction of the workpiece. Furthermore, it was confirmed that the range of the phase with a solution and the range of the phase without a solution differed for each workpiece.

When an installation phase that was a phase indicating the position where the test weight was installed was set in the direction of an arrow FA illustrated in FIGS. 10(*a*) to 10(*d*) in each workpiece, it was confirmed that any workpiece was in a "with a solution" condition. That is, it was confirmed that when the correction method of the first embodiment was carried out for a correction, if the installation phase of the test weight was set to be a phase where the peak vibration value after the correction becomes the minimum (ideal correction phase), all workpieces were in a "with a solution" condition. The arrow FA runs from the axial line of the workpiece to the center of the angular width of the phase with a solution in each workpiece. Hence, when the ideal correction phase is predicted from the initial vibration measuring result (the measured results of the vibration value of the rotator before the provisional correction and the phase thereof), the phase (direction) at which the provisional correction is performed in the provisional correction step S2 can be the adequate correction phase. Moreover, in the adequate correction amount calculating step S5, all circles have partial overlap area among the plurality of circles AS indicating the range of the set of terminal points of correction vectors. That is, it becomes a "with a solution" condition. Those circles AS can be obtained by calculating the range of the set of terminal points of correction vectors for obtaining the vibration value satisfying the vibration standards based on the vibration vectors at respective rotation speeds.

Unlike the above explanation, when the imbalance correction is performed on the rotator not by adding the test weight but by cutting the impeller nut 22, the correction phase (direction) is a phase shifted by 180 degrees from the installation phase of the test weight. That is, the direction shifted by 180 degrees from the direction of the arrow FA illustrated in FIGS. 10(a) to 10(d) is the ideal correction phase (direction of arrow FA) when a correction is performed on the workpiece by cutting the impeller nut 22.

The characteristics possessed by the workpiece appear in a maximally emphasized manner at the rotation speed corresponding to the natural frequency of the jig. Hence, it is predicted that the imbalance direction of the workpiece matches the direction in which vibration occurs. Moreover, it is predicted that the ideal correction phase can be derived at the time of initial vibration measurement, when the vibration phase of the rotator at the rotation speed corresponding to the natural frequency of the jig is grasped. Accordingly, when the relationship between the natural frequency of the jig and the ideal correction phase was examined using jigs with different natural frequencies, it was confirmed that the vibration occurring direction and the ideal correction phase matched with each other at the rotation speed corresponding to the natural frequency of the jig. The term "natural frequency of the jig" means a natural frequency of the whole correction device (however, the upper part of the correction device above the vibration absorbing rubber members 11) including the mounting jig 12 and the turbocharger 20 with the turbocharger 20 in a non-rotated condition being mounted on the mounting jig 12 in FIG. 2.

Figure 11:
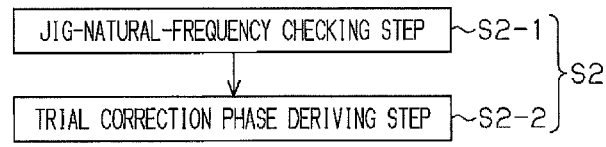
FIG. 11 is a flowchart illustrating a provisional correction process in an imbalance correction method according to a second embodiment.

The imbalance correction method of the second embodiment has been made in view of the above-described discussion. That is, the imbalance correction method of the second embodiment includes the respective steps of the first embodiment, i.e., the initial vibration measuring step S1, the provisional correction step S2, the imbalance state checking step S3, the correction-vector-set range calculating step S4, the adequate correction amount calculating step S5, and the imbalance correcting step S6, and only the provisional correction step S2 differs from that of the first embodiment. As illustrated in FIG. 11, the provisional correction step S2 of the second embodiment includes a jig-natural-frequency checking step S2-1 and a trial correction phase deriving step S2-2.

In the jig-natural-frequency checking step S2-1, the control device 16 calculates a rotation speed corresponding to the natural frequency of the jig from the natural frequency of the jig detected when the turbocharger 20 is in a non-rotated condition. Next, in the trial correction phase deriving step S2-2, the control device 16 sets a provisional correction phase (correction direction) based on the initial vibration phase of the rotator at the rotation speed corresponding to the natural frequency of the jig, and calculates a provisional correction amount that is a correction amount on a trial basis from the correction vector corresponding to that correction direction. Subsequently, the control device 16 outputs signals including the calculated provisional correction amount and provisional correction phase to the correction machining device 17. The correction machining device 17 cuts (trial cutting) the impeller nut 22 based on the signals output by the control device 16. Thereafter, the respective steps that are from the imbalance state checking step S3 to the imbalance correcting step S6 are performed like the first embodiment, and the imbalance correction completes.

Hence, according to the second embodiment, the following advantage is achieved in addition to the same advantages as those of (1) to (3) of the first embodiment.

(4) The correction phase at the time of the provisional correction is calculated based on the initial vibration phase at the rotation speed of the rotator corresponding to the natural frequency of the jig. Hence, the correction phase at the time of the provisional correction can take a further adequate value. The control device 16 can calculate a further adequate definite correction vector regardless of the imbalance state of the rotator before the provisional correction.

FIGS. 12(a) to 14 illustrate a third embodiment of the present invention. The present embodiment differs from the first embodiment in that the trial cutting level of the impeller nut 22 is set to be a further adequate level to cut the impeller nut 22 on a trial basis when a provisional correction (trial cutting) is performed in the provisional correction step S2. The same elements as those of the first embodiment will be denoted by the same reference numerals, and the detailed explanation thereof will be omitted.

When the imbalance correction method of the first embodiment was applied to various workpieces (turbochargers), the vibration value after the correction did not satisfy the vibration standards depending on the workpiece. More specifically, even if the definite correction was performed such that the adequate correction amount (correction amount and correction phase) calculated in the adequate correction amount calculating step S5 was accomplished, the vibration value of the rotator (vibration value of turbocharger) after the definite correction may mismatch the predicted vibration value predicted as it was obtained after the definite correction. The cause of this technical problem was studied, and it was concluded that vibration measurement of the rotator always contained variability, and depending on the correction amount at the time of provisional correction in the provisional correction step S2, the variability at the time of vibration measurement after the provisional correction became large. As a result, it is thought that the predicted vibration value of the rotator and the actual correction result (vibration value after the definite correction) have a mismatch there between.

FIGS. 12(a) and 12(b) illustrate an image of the effect of variability at the time of vibration measurement. In a two-dimensional plane illustrated in FIGS. 12(a) and 12(b), the dimension (radius) of a circle indicating each vibration represents the level of the variability of vibration.

As illustrated in FIG. 12(a), when the provisional correction amount is inadequate, the variability of vibration after the definite correction (vibration after correction) is large. In contrast, as illustrated in FIG. 12(b), when the provisional correction amount is adequate, the variability of vibration after the definite correction (vibration after correction) is small. The relationship between the initial imbalance amount and the initial vibration average value (acceleration) was examined, and it was confirmed that there was a strong correlation (proportional relationship) there between as illustrated in FIG. 13. The proportional constant in FIG. 13 changes depending on product design values, such as the shaft diameter of the rotator, the shaft length thereof, and the mass of the rotator, the oscillation condition of the jig and the mass thereof, and is a unique value to each kind of the rotator and jig.

Figure 14:
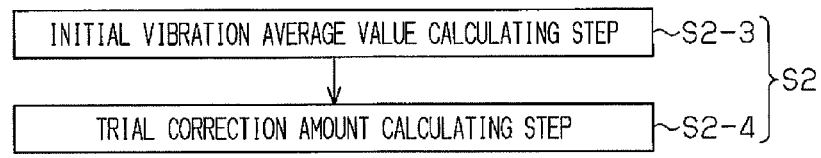
FIG. 14 is a flowchart illustrating a provisional correction process of an imbalance correction method according to a third embodiment.

Based on the above-described discussion, the imbalance correction method of the third embodiment has been made. The imbalance correction method of the third embodiment includes the respective steps of the first embodiment, i.e., the initial vibration measuring step S1, the provisional correction step S2, the imbalance state checking step S3, the correction-vector-set range calculating step S4, the adequate correction amount calculating step S5, and the imbalance correcting step S6, but only the provisional correction step S2 differs from that of the first embodiment. As illustrated in FIG. 14, the provisional correction step S2 of the third embodiment includes an initial vibration average value calculating step S2-3, and a trial correction amount calculating step S2-4. The control device 16 stores a map or a relational expression representing a relationship between an initial condition imbalance amount obtained in advance for each jig and an initial vibration average value (acceleration) in the memory.

In the initial vibration average value calculating step S2-3, the control device 16 calculates an average value of the vibration value (more specifically, acceleration) within the range of the determination rotation speeds and checked in the initial vibration measuring step S1. Next, in the trial correction amount calculating step S2-4, the control device 16 calculates an initial condition imbalance amount based on the map or the relational expression representing the relationship between the initial condition imbalance amount and the initial vibration average value, and the initial vibration average value calculated in the initial vibration average value calculating step S2-3. Moreover, the control device 16 calculates a provisional correction amount, which is a correction amount on a trial basis, from the initial condition imbalance amount. Furthermore, the control device 16 obtains a provisional correction phase (provisional correction direction), which is a correction phase on a trial basis based on the ideal correction direction in the second embodiment or an arbitrary correction vector. Subsequently, the control device 16 outputs signals including the provisional correction amount and the provisional correction phase to the correction machining device 17. The correction machining device 17 cuts the impeller nut 22 based on the signals output by the control device 16. Thereafter, the steps from the imbalance state checking step S3 to the imbalance correction step S6 are performed like the first embodiment, and the imbalance correction of the rotator completes.

Hence, according to the third embodiment, the following advantage are achieved in addition to the same advantages as those of (1) to (3) of the first embodiment.

(5) The correction amount when the provisional correction is performed is calculated based on the relationship between the average value of the initial vibration values and the initial condition imbalance amount. Hence, the correction amount when the provisional correction is performed becomes further adequate. Accordingly, the vibration value after the imbalance correction is performed based on the correction amount and the correction phase set on the basis of the definite correction vector becomes able to further surely satisfy the vibration standards.

Figure 15A:
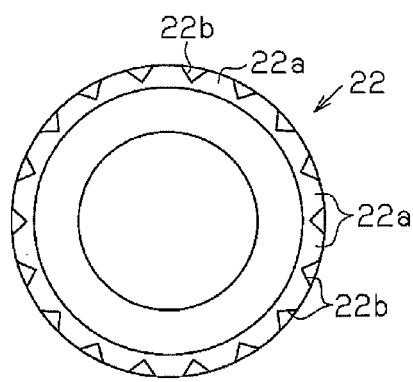
FIGS. 15(a) to 15(d) are diagrams describing a conventional impeller nut grinding technique.
Figure 15B:
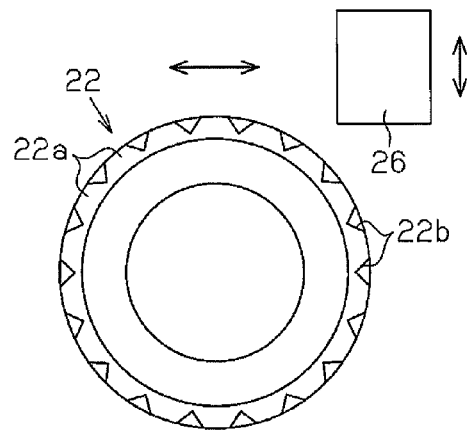
Figure 15C:
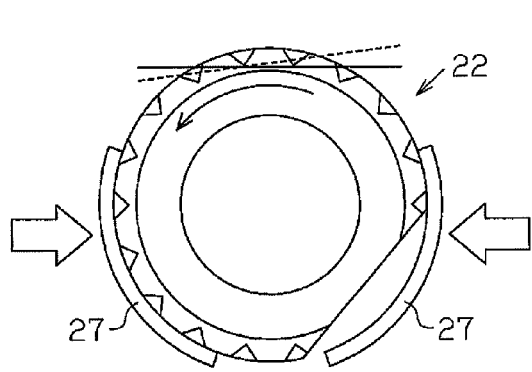
Figure 15D:
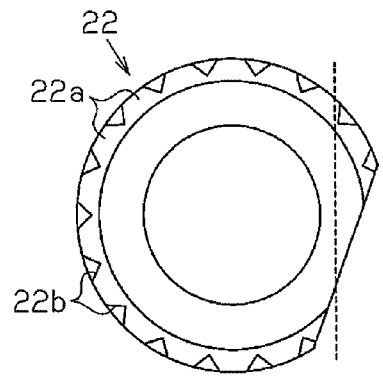

FIGS. 15(a) to 16(d) illustrate a fourth embodiment of the present invention. The fourth embodiment has a feature in the shape of the impeller nut 22 and cutting method thereof. When imbalance is corrected by cutting the impeller nut 22, conventionally, as illustrated in FIG. 15(a), the impeller nut 22 having a large number of projections 22a and recesses 22b formed in the outer periphery is used. As illustrated in FIG. 15(b), the correction machining device moves (drives) a grinding tool 26 in the tangent line direction of the impeller nut 22 to cut the impeller nut 22, and moves the grinding tool 26 in the perpendicular direction to the running direction thereof, thereby adjusting the cutting depth to adjust the cutting level. There is such a correction machining device that cuts and machines a part of the impeller nut 22 to correct the impeller nut 22. In this case, however, the necessary number of axes to allow a machining unit to move the grinding tool 26 is two, which is expensive in comparison with a monoaxial case. Moreover, since the cutting is performed across the projections 22a and the recesses 22b, the cutting level (correction amount) often has an error which is likely to occur by the cutting. Moreover, as illustrated in FIG. 15(c), in the correction machining in the imbalance correction step S6, the impeller nut 22 may be clamped by a pair of clamp members 27. In this case, when respective clamping position of the impeller nut 22 by the clamp members 27 overlap the portion cut in the provisional correction step S2, the cutting phase may be misaligned. Furthermore, when the correction phase in the imbalance correcting step S6 is the same phase as the correction phase in the provisional correction step S2, or when a part of the corrected portion in the imbalance correcting step S6 overlaps a portion having already undergone the cutting and machining in the provisional correction step S2 as illustrated in FIG. 15(d), it becomes unable to correct the impeller nut 22.

Figure 16A:
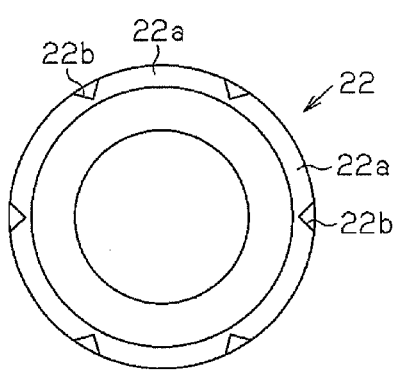
FIGS. 16(a) to 16(d) are diagrams each describing an impeller nut grinding method according to a fourth embodiment.
Figure 16B:
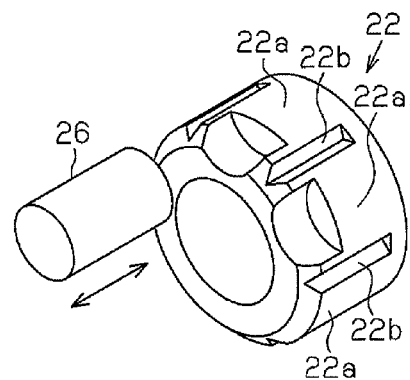
Figure 16C:
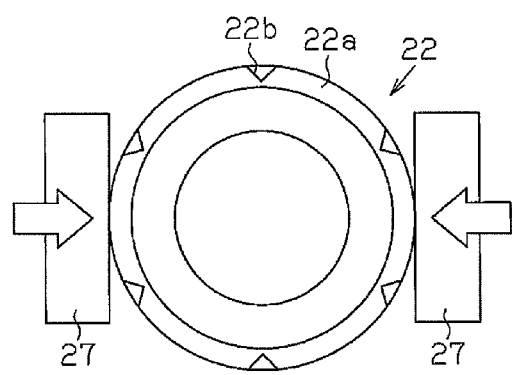
Figure 16D:
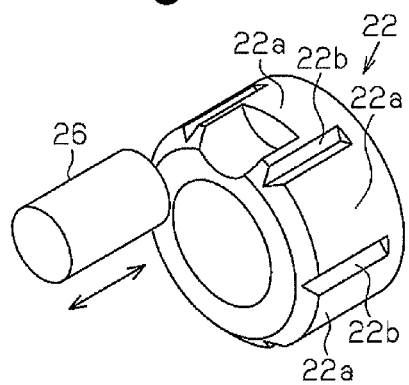
Figure 17:
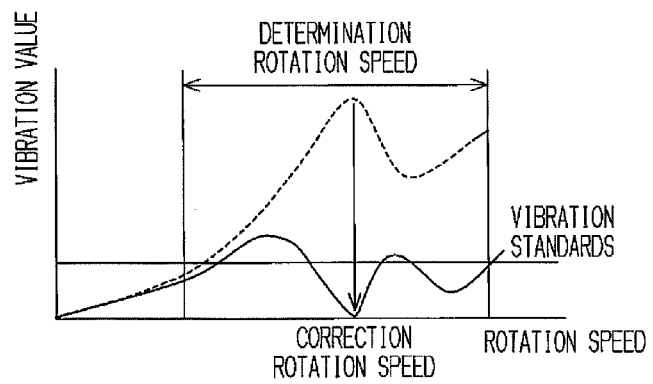
FIG. 17 is a graph illustrating a technical disadvantage when a correction is performed through the technique disclosed in Patent Document 1.

In contrast, according to the fourth embodiment, as illustrated in FIG. 16(a), the impeller nut 22 having projections 22a with a larger width (angular width) than the conventional impeller nut 22 is used. That is, the pitch of the recesses 22b is extended. Moreover, the cutting position of the impeller nut 22 is limited to the projections 22a, and two portions of the impeller nut 22 are cut and the cutting phase is adjusted by a synthesized vector. Those features are remarkably different from the conventional cutting technique. The cutting is carried out by, as illustrated in FIG. 16(b), moving the grinding tool 26 in parallel with the axial direction of the impeller nut 22 at a constant distance from the center of the impeller nut 22. The cutting level is adjusted by adjusting a cutting distance, i.e., the displacement of the grinding tool 26. Hence, according to the fourth embodiment, the necessary number of axes for the machining unit (correction machining device 17) to move the grinding tool 26 is one. Moreover, as illustrated in FIG. 16(c), the clamping positions of the impeller nut 22 by the clamp members 27 are limited to the projections 22a not to be machined.

Accordingly, when the impeller nut 22 of the fourth embodiment and the cutting method thereof are applied to the first to third embodiments, the following advantages can be accomplished in addition to the advantages of the respective embodiments.

(6) The imbalance of the rotator is corrected by cutting and machining the impeller nut 22 having equal to or greater than six projections 22a (with an angular width of substantially 60 degrees), and the corrected positions (cutting positions) are limited to the projections 22a. Hence, the correction amount does not contain an error due to the recesses and projections.

(7) The clamping position of the impeller nut 22 held by the clamp members 27 when the impeller nut 22 is subjected to a correction and machining is limited to the portion not subjected to the machining. Moreover, the correction machining is performed on the two locations (two projections 22a) of the impeller nut 22. Accordingly, the clamping position of the clamped impeller nut 22 does not include the corrected portion cut in the provisional correction. Hence, the correction precision of the rotator is not deteriorated, and the correction precision is improved.

(8) The grinding tool 26 is moved in parallel with the axial direction of the impeller nut 22 at a constant distance from the center of the impeller nut 22, thereby cutting and machining the impeller nut 22. Accordingly, the number of axes of the machining unit becomes one, and thus the machining unit of the fourth embodiment, i.e., the correction machining device 17 is inexpensive in comparison with the conventional biaxial type.

(9) The cutting level of the impeller nut 22 is adjusted through an adjustment of the cutting distance (displacement of the grinding tool 26). Hence, even if the correction phase of the provisional correction and the correction phase of the definite correction become the same, the impeller nut can be adequately corrected and machined.

Those embodiments are not limited to the above-described cases, and may be embodied, for example, as follows.

In the adequate correction amount calculating step S5, as the definite correction vector for calculating the adequate correction amount (definite correction amount and definite correction phase), a correction vector interconnecting the origin of the coordinate in FIG. 6(b) and an arbitrary point within an overlap area Ao may be selected. For example, a vector that interconnects the origin in FIG. 6(b) and the weight center of the overlap area Ao may be selected as the definite correction vector. Alternatively, imbalance correction effects for all correction vectors indicating the adequate correction amounts when a correction is performed at the correction amount and the correction phase calculated based on respective correction vectors are obtained through a simulation. Next, the correction vector having the highest correction effect among all of the correction vectors may be selected as the definite correction vector. However, selection of the definite correction vector is simplified when a correction vector interconnecting the weight center of the overlap area Ao with the origin of the coordinate is selected.

The imbalance correction (cutting and machining) of the rotator in the provisional correction step S2 and the imbalance correcting step S6 is not limited to the technique of cutting the impeller nut 22. For example, a member for a cutting correction other than the impeller nut 22 may be fastened to the rotating shaft of the turbocharger 20 so as to be rotatable together with the impeller 21, and the member for a cutting correction may be cut. The correction in the provisional correction step S2 and the imbalance correcting step S6 can be carried out in this way.

The correction in the provisional correction step S2 and the imbalance correcting step S6 may be carried out by adding a weight for a correction to the rotator instead of cutting the impeller nut 22 or the member for a cutting correction. For example, a correction weight installer like the test weight installer 25 described in the second embodiment may be attached to the rotator. In the provisional correction step S2 or the imbalance correcting step S6, a weight corresponding to the correction amount may be attached to the correction weight installer.

The number of the projections 22a of the impeller nut 22 in the fourth embodiment may be larger than six.

The correction device does not necessary need to have both imbalance amount calculating device and correction machining device 17. For example, the imbalance amount calculating device and the correction machining device 17 may be provided independently from each other. An exclusive correction machining device may perform correction machining on the impeller nut 22 at the correction amount and the correction phase calculated by the imbalance amount calculating device.

In the initial vibration measuring step S1 and the imbalance state checking step S3, the interval of the rotation speed for measuring the vibration state (vibration value and phase) of the rotator is not limited to the interval of 200 rpm, and may be smaller than 200 rpm or may be larger. The smaller the interval of the rotation speed becomes, the higher the precision becomes, but the labor workpiece for calculation increases. In contrast, the larger the interval of the rotation speed becomes, the lower the precision becomes, but the labor workpiece for calculation decreases. The interval of the rotation speed can be increased up to substantially 1000 rpm.

It is not necessary to set the range of the determination rotation speeds to be the same range of the actual rotation speeds of the turbocharger 20 in practice, and such a range can be set within a range where the rotation vibration possibly becomes large when the turbocharger 20 is in use. For example, even if the range of the actual rotation speeds of the turbocharger 20 in practice is wide, it is unnecessary to make the range of the determination rotation speeds widespread up to the range of the slow rotation speeds where there is no possibility that the rotation vibration becomes large when the turbocharger 20 is in use.

The rotating device is not limited to the turbocharger 20, and may be other rotating devices, such as a rotating electrical machine, and a turbine for power generation.

The following technical ideas (inventions) are understandable from the above-described embodiments.

(1) An imbalance correction method for correcting imbalance of a rotator, the rotator being fastened to a rotating shaft of a rotating device by a nut, the imbalance correction method including in order to correct the imbalance of the rotator by cutting the nut:

using as the nut a nut having six or more projections; and correcting the imbalance of the rotator by cutting and machining only the projections.

(2) The imbalance correction method of the technical idea (1), further including:

clamping the nut when cutting and machining the projections, in which a clamping position of the nut is limited to a portion not subjected to machining, and cutting and machining of the nut is performed on two different ones of the projections.

(3) The imbalance correction method of the technical idea (1) or (2), in which cutting and machining of the nut includes: moving a cutting tool in parallel with an axial direction of the nut at a constant distance from a center of the nut.

DESCRIPTION OF THE REFERENCE NUMERALS

AS Circle indicating range of set
Ao Overlap area
V1$s$, V2$s$, V3$s$ Correction vectors
13 Vibration pickup configuring vibration value measuring unit and vibration phase measuring unit
15 FFT analyzer likewise
14 Laser rotation indicator as rotation speed measuring unit
16 Control device as calculating unit

The invention claimed is:

1. An imbalance correction method for correcting imbalance of a rotator, the method comprising:
   measuring a vibration state of the rotator before a provisional correction and a vibration state of the rotator after the provisional correction at multiple rotation speeds within a range of determination rotation speeds;
   calculating, from vibration vectors at the respective rotation speeds, a range of set of terminal points of correction vectors for obtaining a vibration value satisfying a vibration standards for each rotation speed;

selecting a definite correction vector from the correction vectors having terminal points in an area where the respective ranges of the sets calculated for the respective rotation speeds overlap with each other among the correction vectors;

setting a definite correction amount and a definite correction phase based on the definite correction vector; and correcting the imbalance of the rotator based on the definite correction amount and the definite correction phase.

2. The imbalance correction method according to claim 1, wherein a correction phase when the provisional correction is performed is set based on an initial vibration phase of the rotator at a rotation speed corresponding to a natural frequency of a jig.

3. The imbalance correction method according to claim 1, wherein a correction amount when the provisional correction is performed is calculated based on a relationship between an average value of initial vibration values of the rotator and an initial condition imbalance amount.

4. The imbalance correction method according to claim 1, wherein as the definite correction vector, a correction vector having a highest correction effect is selected among the correction vectors having terminal points in the area where the respective ranges of the sets overlap with each other.

5. An imbalance correction amount calculating device that calculates a correction amount for correcting imbalance of a rotator, the device comprising:

a rotation speed measuring unit that detects a rotation speed of the rotator;

a vibration value measuring unit;

a vibration phase measuring unit; and a calculating unit that calculates an adequate correction amount for correcting the imbalance of the rotator, wherein the calculating unit is configured to calculate, for each rotation speed, a range of set of terminal points of correction vectors for obtaining a vibration value satisfying a vibration standards from a vibration vector at each rotation speed based on a vibration state of the rotator before a provisional correction and a vibration state of the rotator after the provisional correction both measured at multiple rotation speeds within a range of determination rotation speeds;

select a definite correction vector from the correction vectors having terminal points in an area where the respective ranges of the sets at the respective rotation speeds overlap with each other among the correction vectors; and calculate an adequate correction amount based on the definite correction vector.

6. The imbalance correction amount calculating device according to claim 5, wherein the calculating unit calculates a correction phase when the provisional correction is performed based on an initial vibration phase of the rotator at a rotation speed corresponding to a natural frequency of a jig.

7. The imbalance correction amount calculating device according to claim 5, wherein the calculating unit calculates a correction amount when the provisional correction is performed based on a relationship between an average value of initial vibration values of the rotator and an initial condition imbalance amount.

* * * * *